Nov. 12, 1963  R. PARTHUM  3,110,167
METHOD OF MAKING A KNIT FABRIC
Filed Nov. 2, 1959  3 Sheets-Sheet 1
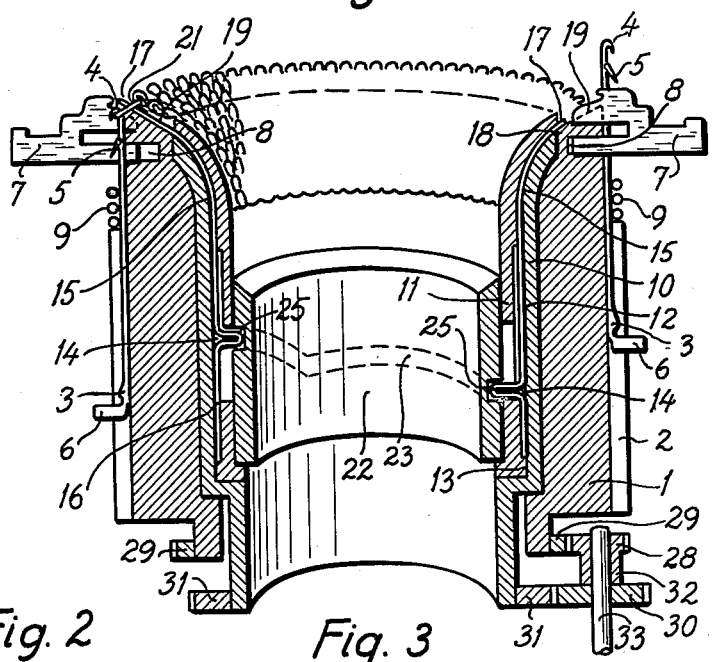
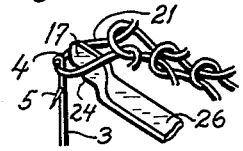
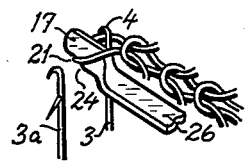
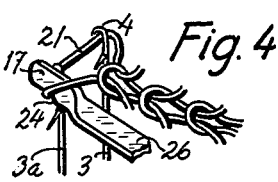
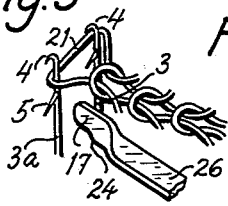
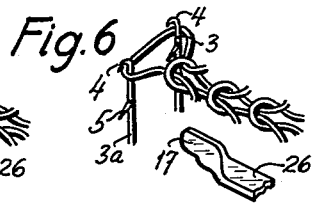
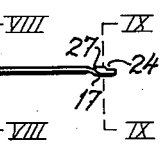
INVENTOR
RICHARD PARTHUM
BY
Mason, Fenwick & Lawrence
Attorneys

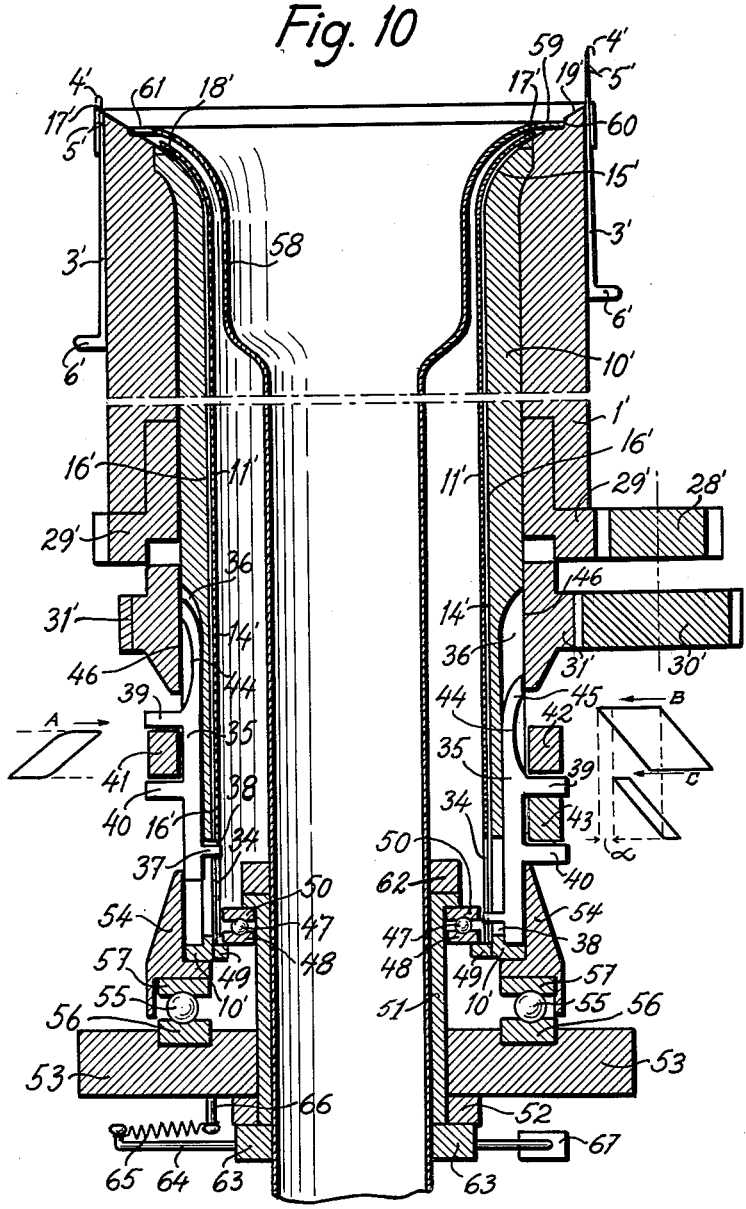

Nov. 12, 1963     R. PARTHUM     3,110,167
METHOD OF MAKING A KNIT FABRIC
Filed Nov. 2, 1959     3 Sheets-Sheet 3
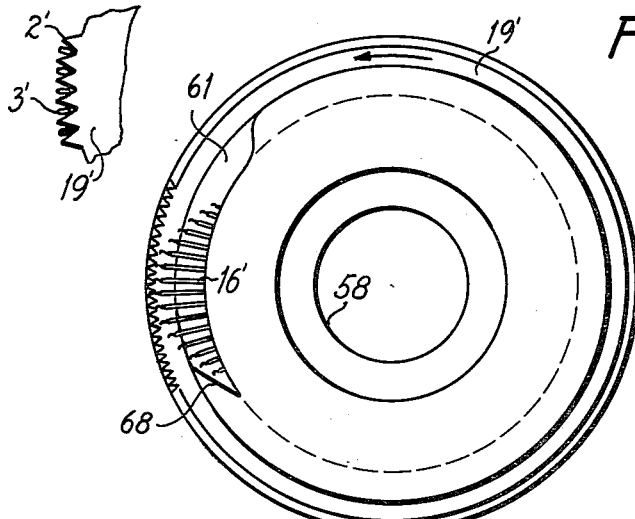
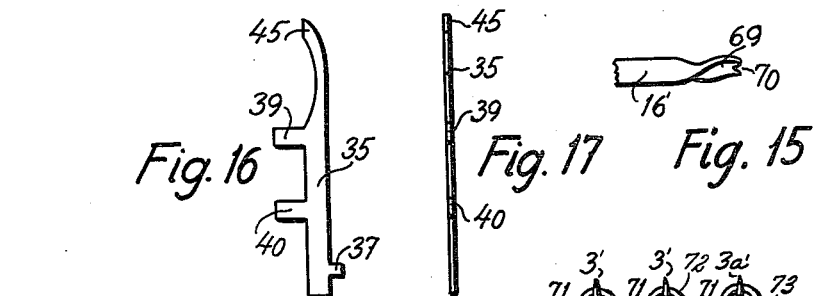
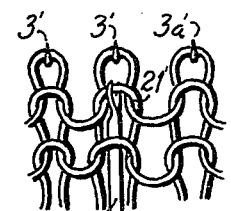
Fig. 18
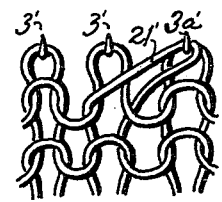
Fig. 19
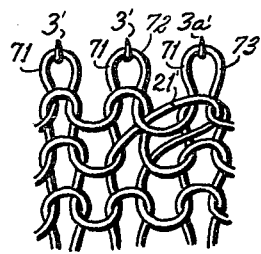
Fig. 20
INVENTOR
RICHARD PARTHUM
BY Mason, Fenwick & Lawrence
Attorneys

3,110,167
METHOD OF MAKING A KNIT FABRIC
Richard Parthum, Sydmarken 10-20, Soborg, near Copenhagen, Denmark
Filed Nov. 2, 1959, Ser. No. 850,421
Claims priority, application Denmark Nov. 1, 1958
4 Claims. (Cl. 66—95)

The invention relates to a method of manufacturing a knitted fabric with locking loops distributed over the fabric by means of a circular knitting machine having a system of vertically movable knitting needles and a plurality of transfer needles mounted rotatably in relation to the knitting needles.

It is known to manufacture knitted fabrics such as net stockings by means of a circular knitting machine, but in general it is only possible by such machines to make so-called plain knitted loops which, as is known, have the drawback that they are only resistant to running in the direction of knitting, that is, from the welt of the stocking downwards, whereas they are not resistant to running counter to the direction of knitting, that is, from the toe of the stocking upwards.

Machines producing locking loops spread over two needles are known, but these require the use of an overhead dial and difficulties have been encountered with their use.

It is the object of the present invention to devise a method of manufacturing, by means of a specially designed circular knitting machine, a knitted fabric such as a stocking which is proof against running both in the direction of knitting and in the opposite direction.

An essential feature of the invention is that the transfer needles move inside the machine cylinder obliquely upwards in a radial plane, clear of the knitting needles to reach an advance position in which each of them engages a knitted loop and due to the rotation of the transfer needles passes the said loop on to and over an adjacent needle.

As a result, a running in the wales provided with such spread or transferred loop will be stopped at the said loop, whether the running occurs in the direction of knitting or in the opposite direction, and such running can be limited to relatively few loops in the wale by distributing the spread or transferred loops uniformly over the total number of wales, or to such places of the stockings as are very exposed to wear, in a predetermined pattern.

As a further result, a loop may, despite the limited space generally available in the cylinder of a circular knitting machine, be spread or transferred from one knitting needle to another.

In one embodiment of the method according to the invention the rotation of the transfer needles is brought about by a relative angular movement between the rotating cylinder of the machine and a cylindrical body which is mounted coaxially in the cylinder and in which the transfer needles are disposed.

As a result, the spreading or transferring movement, without limiting the normal rate of knitting, may be performed progressively during the movement performed by the transfer needle and the knitting needle in relation to each other, and be distributed over a substantial part of the circumference of the cylinder, whereby the thread is not subjected to so heavy mechanical stresses as is the case if the said movement takes place in jerks within an angle corresponding to the division between two successive knitting needles. In another embodiment of the method according to the invention the relative angular movement is performed in such manner that the loops spread or transferred by the transfer needles are staggered by at least one wale in successive courses. As a result, the desired resistance to running can be distributed uniformly over the stocking so that each individual wale is secured by at least one spread or transferred loop.

The invention is furthermore concerned with a circular knitting machine for carrying the method into effect, and such a machine has a cylindrical body composed of two close fitting coaxial sleeves in whose confronting surfaces, there are formed longitudinal passages partially curved in axial plane. In a predetermined number of the passages there are transfer needles. The said surfaces of the coaxial sleeves are cylindrical along the part remote from the upper points of the transfer needles, but those parts of the surfaces close to the points flare out to form a trumpet the edge of which abuts on a conical surface formed on the end surface of the cylinder, the said conical surface being provided with guiding slits for the sinkers of the machine. The upper edge of the trumpet is located on a level with the heads of the knitting needles when these are in their transfer position.

As a result of this, a vertical movement of the needle butt of a transfer needle causes such displacement of the outer end of the transfer needle as is suitable for spreading or transferring the loop, the movement being substantially in an obliquely upward direction and in a radial plane. By reason of this the small space inside the cylinder is effectively utilised so that, despite the use of the sleeves, room is left for the knitted fabric finished at any given moment to extend downwards through the inner space of the inner sleeve.

In one embodiment of the circular knitting machine according to the invention the inner one of the coaxial sleeves is provided with an inside locking ring which is stationary in relation to the rotating cylinder but rotatable about the axis of the cylinder and provided with a guiding passage adapted to displace the transfer needles and consequently the upper points of these from their retracted position to their advanced position and retracted the said guiding passage being so designed and disposed that the said displacements occur at the time when a predetermined knitted loop, which is to be spread or transferred, is just opposite the upper point of the transfer needle.

As a result, a rotation of the locking ring about the axis of the cylinder may be utilised to regulate the moment for the appropriate cooperation between the transfer needles and the knitting needles.

In another embodiment of the circular knitting machine according to the invention the passages are preferably formed in the outer cylindrical surface of the inner one of the two coaxial sleeves, the said inner sleeve having on its lower part radial slits extending through the wall of the sleeve, through which slits plate-shaped jacks for each of the transfer needles project. The said jacks are guided in the outer sleeve and engage notches formed near the lower end of the transfer needles.

As a result, each individual transfer needle may, by a displacement of the jacks at a predetermined moment during the rotation of the machine cylinder, be moved from its retracted position to its advanced position, and conversely.

In a third embodiment of the circular knitting machine according to the invention, the jacks are provided with butts adapted to cooperate with adjustable cams surrounding the said outer sleeve and being of such design that at predetermined moments during the rotation of the cylinder they impart to the jacks a vertical displacing movement.

As a result, the transfer needles are, owing to the jacks engaging the notches provided in the transfer needles at a predetermined moment move from their retracted position to their advanced position, the said moment being variable by turning the adjustable cams.

In a fourth embodiment of the circular knitting machine according to the invention each of the jacks has two butts each cooperating with its cam with one of the cams being placed beneath the other one, and staggered in relation to the other one, by a fraction of a revolution in the direction of rotation of the cylinder.

This provides double security for the withdrawal of the transfer needles from their advanced to their retracted position even though one of the butts, for example, the upper one, should have broken during the operation of the machine.

As a further result, the jacks can readily be removed from the slits provided in the two sleeves, even though one of the butts might be broken.

In a fifth embodiment of the circular knitting machine according to the invention the lower cam, which is staggered in relation to the upper cam, is electrically insulated from the frame of the machine and connected to an electric alarm device and a voltage generator, one pole of which is connected to the said frame.

As a result, there will be an alarm signal if one of the lower butts of the jacks touch the lower cam, which is a safe indication that one of the jacks has lost its upper butt and the machine consequently is defective.

In a sixth embodiment of the circular knitting machine according to the invention, the outer end sections of the jacks are formed with a curvature and with a flat edge resting against an outer wall of the guiding slit of the outer sleeve. As a result, the jack can be readily introduced radially into the said guiding slit and subsequently be displaced vertically to engage the notch provided in the transfer needle and be retained by an annular sleeve.

In a seventh embodiment of the circular knitting machine according to the invention, the inner sleeve is coupled along its upper edge in the outer sleeve by means of teeth corresponding to the passages provided in the inner sleeve, the last mentioned sleeve being guided along its lower edge in a bearing disposed coaxially with the cylinder of the machine.

As a result, the inner sleeve can be readily removed from and inserted in the machine without the latter being dismantled, and the transfer needles may be introduced into the passages through the opening of the latter at the upper edge of the inner sleeve.

In an eighth embodiment of the circular knitting machine according to the invention a fabric guiding funnel, a so-called discharge funnel, is placed concentrically within the inner sleeve for guiding the knitted part of the fabric, the said funnel or trumpet resting by its upper outward-projecting edge against a depression provided in the conical surface formed in the end surface of the cylinder and having a recess for the transfer needles in their advanced position. The funnel is rotatably mounted and provided with a tangentially arranged helical spring which keeps the funnel in a fixed position in relation to the working position of the transfer needles, one end wall of the aforesaid recess being formed tangentially to the said depression. The funnel is further provided with an electric contact adapted to alarm when the funnel is turned away from the fixed position.

As a result, there will be an alarm signal if the funnel is turned in case a defective knitting needle is not in the proper moment pulled down beneath the funnel and therefore strikes one end edge of the recess, the electric alarm contact being further adapted to stop the rotation of the machine cylinder immediately in such case.

In a ninth embodiment of the circular knitting machine according to the invention the vertically movable knitting needles are supported in slits having wedgeshaped cross-section, the said slits being formed radially in the upper outer edge of the machine cylinder.

As a result it is not necessary that the knitting needles have tangential clearance in the slits, the needles being caused to contact the oblique surfaces of the wedge-shaped slits under the action of the inwardly directed tension exerted by the loops so that improved precision is obtained in regard to the distribution of the knitted loops along the upper edge of the cylinder with consequent greater certainty of the transfer needles effectively engaging the loops to be spread or transferred.

The invention is furthermore concerned with transfer needles for a circular knitting machine of the aforesaid kind, and an embodiment of a transfer needle and having a needle butt adapted to cooperate with the cam groove of the locking ring, and having a bendable part of its length nearest the upper point of the needle of rectangular cross-section, the longer dimension of which is located at right angles to the direction of the needle butt and the shorter dimension of which is smaller than the remaining cross-sectional dimensions of the needle.

As a result, the needle offers only minimum resistance to bending in the curved passages, and the material, which is preferably steel, is not fatigued by the constant bendings during the operation of the machine. A further result obtained is that in its advanced position the outer point of the needle is effectively guided laterally by the side walls of the passage so that the outer point is not caused to vibrate, which might render the introduction of the needle into the loop already knitted less accurate.

In another embodiment of the transfer needle according to the invention the point of the needle is of rectangular cross-section, the longer dimension of which is located parallel with the direction of the butt of the needle and one edge surface of which is flush with such surface of the bendable part as is located opposite the needle butt, whereby adaptation of the outer point of the needle to the interior of the preferably oblong, vertically arranged loop is obtained, so that the introduction of the needle into the loop already knitted is facilitated.

In a third embodiment of the transfer needle according to the invention the point of the needle is provided with a notch in the said edge surface which faces the knitting needles, as a result of which the loop, when it has been engaged by the outer point of the needle, remains on the needle, retained during the spreading or transfer of the loop by means of the notch.

In a fourth embodiment of the transfer needle according to the invention, the needle is throughout its length of rectangular cross-section and is twisted at its upper point 50–90° about its longitudinal axis and provided with a notch to receive the loop already knitted, whereas the needle at its lower end is provided with a notch adapted to cooperate with the jacks. As a result, the needle can be readily bent about its greatest cross-section axis, but is relatively rigid against bendings and vibrations about its smallest cross-sectional axis and, by the way, may readily be made of strip-shaped material, for example steel.

In a fifth embodiment of the transfer needle according to the invention the distance between the outer point of the needle and the said notch is such that the jacks can pass the point of the needle to such an advanced position that the point enters a finish-knitted loop which, of course prior to this, had been released from the knitting needle by which it had been knitted.

As a result, the said finished loop is, by the relative movement between the rotating cylinder of the machine and the cylindrical body, transferred wholly by the transfer needle to an adjacent needle so that a locking loop of new design is produced.

The invention is furthermore concerned with a locking loop produced by means of a circular knitting machine according to the invention, the said loop being formed from a loop knitted a course prior to the last knitted course which has been advanced by one course in the direction of knitting and by at least one wale to the side.

The invention will now be further explained in the following with reference to the drawing, in which FIGURE 1 is a schematic diametral section of important parts of an embodiment of a circular knitting machine for carrying the method according to the invention into effect.

FIGURES 2-6 show various stages in an embodiment of the method according to the invention with the use of a circular knitting machine as shown in FIGURE 1.

FIGURE 7 shows an embodiment of a transfer needle for use in the circular knitting machine according to the invention illustrated in FIGURE 1, FIGURES 8 and 9 are sections on the line VIII—VIII and the line IX—IX, respectively of FGURE 7, FIGURE 10 is a diametral section of important parts of another embodiment of a circular knitting machine according to the invention.

FIGURE 11 is the same, viewed from above,

FIGURE 12 is a part of the upper edge of the same on an enlarged scale.

FIGURE 13 is an embodiment of a transfer needle for use in the machine disclosed in FIGURES 10-12, FIGURE 14 is a section of same on the line XIV—XIV of FIGURE 13, FIGURE 15 is the point of the said needle on an enlarged scale, viewed from such side of the point as is facing the knitting needles of the machine.

FIGURES 16 and 17 show a jack for the transfer needle and for use in the machine shown in FIGURE 10, viewed from the side and from the edge, respectively.

FIGURES 18, 19 and 20 show three stages in the knitting of a loop according to the invention by means of the machine shown in FIGURES 10-12.

In the drawing, 1 is a rotatably mounted cylinder in a circular knitting machine of a known type, the said cylinder being provided along its circumference provided with longitudinal radial grooves 2 serving as guides for knitting needles 3 of the latch needle type with heads 4, and latches 5. Each of the knitting needles 3 has a needle butt 6 cooperating in known manner with a locking ring (not shown) which encloses the cylinder 1 and, in cooperation with sinkers 7, guides the upward and downward movement of the knitting needles in the grooves 2 by means of a cam groove. The sinkers 7 are supported in guiding slits 8 formed radially in the upper end surface of the cylinder. By means of a rotatable sinker control rim (not shown) mounted on the cylinder 1, the said sinkers cooperate at suitable moments during the knitting operation with the knitting needles 3, discharging the knitted loops and retaining the knitted fabric during the upward movement of the knitting needles. The knitting needles 3 are kept in close contact with the upper part of the surface of the cylinder 1 by means of annular spiral springs 9.

Knitting of plain loops or stitches by means of a circular knitting machine is assumed to be known, and a detailed description of the manner in which the head 4 of the knitting needle 3, its latch 5 and the sinker 7 cooperate is unnecessary since the invention relates solely to a method and means by which ordinary loops already knitted may be transferred to needles lying close to each other, thus making it possible by means of a circular knitting machine to produce a net or lace stocking with locking loops, which operation has hitherto been considered impossible.

In a circular knitting machine according to the invention and as shown in FIGURE 1, there is provided a cylindrical body inside the cylinder 1 and coaxial with cylindrical body inside the cylinder 1 and coaxial with the same, the said cylindrical body being adapted to perform a relative angular movement in relation to the cylinder 1. The said cylindrical body consists of two coaxial sleeves 10 and 11, exchangeable with each other along their end edges. The surfaces 12 and 13 of the said sleeves, which surfaces fit closely to each other, are provided with longitudinal passages 14 which in an axial plane are partially curved as shown at 15 and in a number of which are positioned transfer needles 16. The two surfaces of the sleeves 10 and 11 that face each other are cylindrical along the part remote from the outer point 17 of the transfer needles, whereas the part close to the points 17 is flared to form a trumpet, the edge 18 of which abuts on a conical surface 19 formed on the end surface of the cylinder. The said conical surface 19 is provided with guiding slits 8 for the sinkers 7, and is located level with the heads 4 of the knitting needles 3 when the said heads are in the appropriate position for transferring an already knitted loop 21 from one knitting needle 3 to another knitting needle 3a.

Inside the inner sleeve 11 is mounted a locking ring 22 which is stationary in relation to the rotatable sleeve 11, but rotatable about the axis of the cylinder, and is provided with a cam groove 23 adapted to displace the transfer needles 16 and consequently the upper points 17 of these from their retracted position, indicated to the right in FIGURE 1, to an advanced position, indicated to the left in FIGURE 1, and conversely. The said cam groove 23 is so designed and disposed that the displacement occurs at the time when the predetermined knitted loop 21 which is to be spread is just opposite the outer point 17 of the transfer needle. In the method according to the invention the outer point 17 of the transfer needle moves from inside the cylinder, guided by the passage 14, preferably in an oblique direction upwards, the needle being bent in the curved part 15 of the passage so that the outer point 17 of the needle slides along the conical surface 19 in timed relation to the withdrawal of the sinkers 7 from their advanced position, which is shown to the right in FIGURE 1, to a retracted position, shown to the left in FIGURE 1, whereby the knitted fabric during the introduction of the outer point 17 of the transfer needle is kept raised by the sinkers 7 and the outer point 17 is allowed to pass freely beneath the knitted fabric from the retracted position of the needle point to the advanced position and over a knitting needle 3 as shown on an enlarged scale in FIGURE 2. The knitting needle 3 retains the knitted loop 21, which is taken up by the outer point 17 of the transfer needle as shown in FIGURE 2, after which the transfer needle, owing to the angular movement performed by the body 10, 11, mounted coaxially in the cylinder 1, in relation to the cylinder 1, is given an angular turn about the axis of the cylinder 1 in relation to the knitting needle 3 as illustrated stepwise in FIGURES 3-6, until the outer point 17 of the transfer needle 16 has been moved by the other knitting needle 3a, to which the loop 21 already knitted is to be spread. In FIGURE 3 the outer point 17 is located between the first and the second knitting needle, 3 and 3a respectively, and the loop has already been pulled slightly in the direction of the second knitting needle 3a. In order to retain the loop 21 in the longitudinal direction of the transfer needle, the outer point 17 of the transfer needle 16 may be provided with a notch 24, FIGURES 3 and 4 show how the said notch 24 contributes during the further angular movement of the transfer needle to distend the loop 21 along a part of the circumference of the row of knitting needles until the transfer needle has been moved by the second knitting needle 3a and a part of the thread of the loop is lying tangentially to the outer sides of the two knitting needles 3 and 3a, after which the second knitting needle 3a, owing to the special design of the locking ring (not shown) which controls the upward and downward movements of the knitting needle, is displaced upwardly and into the spread loop so as to ensure that the head of the second knitting needle retains the loop when the transfer needle 16 is returned progressively to its retracted position as shown in FIGURES 5 and 6. The knitting needle 3a is subsequently lowered again so as to retain the spread loop 21 in cooperation with the sinkers 7, which are now moved radially inwards. In the retracted position of the transfer needle its outer point 17 goes clear of all knitting needles, sinkers 7 and loops 21.

By this operation a half transfer or a spreading of the loop 21 has been carried out and the transfer needle 16 may freely continue its relative movement in relation to the cylinder 1 during the subsequent normal knitting of new loops, but simultaneously a consecutive transfer needle has commenced the transfer of a loop already knitted.

It will be appreciated that the number of transfer needles along the circumference of a body is smaller than the number of knitting needles along the circumferential edge of the cylinder 1, and that it may be advantageous to use such a relative angular movement between the body and the cylinder that the spread loops in consecutive courses are staggered by at least one wale, whereby a predetermined pattern for the distribution of spread loops in the individual wales and the individual courses can be built up during the knitting operation.

FIGURE 7 shows a suitable embodiment of a transfer needle according to the invention for use in the circular knitting machine described with reference to FIGURE 1.

The transfer needle 16 is in known manner provided with a needle butt 25 adapted to cooperate with the cam groove 23 of the locking ring 22. Needle 16 is bendable along a part 26 of its length, and close to the point the needle is of rectangular cross-section as shown in FIGURE 8, the longer dimension of the said cross-section being located at right angles to the direction of the needle butt 25, its shorter dimension being smaller than the remaining cross-sectional dimensions of the needle. The size of the longer dimension of the cross-section corresponds closely to the width of the passages 14 in peripheral direction, whereby the bendable part is guided safely in the curved part of the passages, and in the advanced position of the needle the bendable part of the needle projects from the opening of the passage 14 in tangential direction in relation to the said curved part. The result obtained is a lateral rigidity sufficient to spread the loop without the transfer needle vibrating even at the thickest thread usable in the machine. The outer point of the transfer needle is of a rectangular cross-section which is turned about 90° in relation to the cross-section of the bendable part 26, so that the cross-section of the point as indicated in FIGURE 9 has its longer dimension located parallel with the direction of the needle butt 25, and the one edge surface 27 of the cross-section is flush with the surfaces of the bendable part 26 which is opposite that of the needle butt 25. As a result, the section where the outer point 17 joins the bendable part 26 can be readily passed across the inner edge of the conical surface 19 without striking the said edge. It will be appreciated that in the retracted position of the transfer needle the outer point 17 of the needle projects beyond the inner edge of the conical surface 19 so that the notch 24 will in no event be liable to strike against the said edge. The gears 28 and 30 and gear wheels 29 and 31 are of different diameters so as to cause relative rotation of sleeve 10 and cylinder 1.

The relative angular movement between the cylinder 1 and the body 10, 11 is brought about by a permanently supported pinion, one gear wheel 28 of which engages a gear 29 attached to the cylinder 1 while its other gear wheel 30 engages a gear 31 attached to the sleeve 10, the two gear wheels 28 and 30 being in fixed connection with each other by means of a sleeve 32 mounted on a shaft 33.

The embodiment of a circular knitting machine shown in FIGURES 10–12 is constructed substantially the same as that shown in FIGURE 1, and the corresponding parts are denoted with identical reference numerals primed. The passages 14' are preferably provided in the outer cylindrical surface of the inner sleeve 11' of the two coaxial sleeves 10', 11', which for example, may be of metal. As will be evident from FIGURE 10, the inner sleeve 11' is made of very thin material the outer cylindrical surface of which has passages 14' carrying the transfer needles 16'. It will be appreciated that the passages 14' may alternatively be formed in the inner cylindrical surface of the outer sleeve 10' and that the inner sleeve 11' in that case has a smooth outer cylindrical surface. It will be further appreciated that one or both sleeves may be made e.g. by casting of a plastic, e.g. nylon. In the embodiment disclosed the inner sleeve 11' is provided along its lower part with radial slits 34 extending through the well of the sleeve, through which slits plate-shaped jacks 35 project, guided in slits 36 provided in the outer sleeve 10' and engaging notches 38 by means of a butt 37, the said notches being formed near the lower end of the transfer needles 16'.

The jacks 35 are provided with butts 39 and 40, projecting radially in relation to the machine cylinder 1' and adapted to cooperate with adjustable cams 41, 42 and 43 surrounding the outer sleeve and being of such design that at predetermined moments during the rotation of the cylinder 1' they impart a vertically displacing movement to the jacks 35. The cam 41 is of the form indicated in FIGURE 10 by A and actuates by means of its upper edge the jacks 35 so that the tooth 37, when the cylinder 1' turns in the direction indicated by an arrow in FIGURE 11, progressively moves the transfer needle 16' to its advanced position, indicated to the left in FIGURE 10, in which position the needle transfers a knitted loop 21' to an adjacent knitting needle 3a' as shown stepwise in FIGURES 18, 19 and 20. The cam 42 is of the form shown at B in FIGURE 10 and is staggered in relation to the cam 41 in such manner that the transfer needle, after the last mentioned cam having brought the needle into its working position, withdraws the needle to its retracted position shown to the right in FIGURE 10. The jacks 35 have as mentioned two butts 39 and 40, and the lower edge of the butt 39 cooperates with the cam 41 to move the needle 16' to its advanced position, while the upper edge of the butt 39 cooperates with the cam 42 for withdrawing the needle to its retracted position. The third cam 43 is of the form indicated by C and is disposed beneath the cam 42 and staggered a slight amount α of a revolution in the direction of rotation of the cylinder in relation to the cam 42, and the cam 43 is of such design and disposed in such manner that its underside cooperates with the upper edge of the other butt 40 in the event of the first mentioned butt 39 having broken during operation of the machine. The lower cam 43 is electrically insulated from the frame of the machine and connected in known manner by a cable (not shown) to an electric alarm device (not shown) and to a voltage generator, one pole of which is connected to the frame of the machine. If the butt 40, which is electrically connected with the frame of the machine, in the event of the aforesaid fault should strike against the cam 43, there will thus be an audible or visible alarm signal, just as the alarm device may be adapted to stop the machine so that the fault can be remedied by replacing the defective jack 35. Such a replacement is effected by removing the jack 35 radially from the guiding slit 36. In order to facilitate the withdrawal of the jack its upper end parts are provided with a curved recess 44 and a plane edge 45 resting against an outer wall 46 in the guiding slit 36 of the outer sleeve 10'. The inner sleeve 11' is coupled along its upper edge 18' in the outer sleeve 10' by means of teeth corresponding to the passages 14' in the inner sleeve. The latter is guided along its lower edge by an axial ball bearing 47 mounted coaxially with the cylinder 1' of the machine, one ring 48 of which ball bearing rests on an upward directed edge 49 of the inner sleeve 11', its other ring 50 resting in an annular sleeve 51 fixed in the machine and guiding both the inner and the outer sleeve 10' and 11', respectively. Sleeve 51 by means of a threaded sleeve 52 is attached to a fixed part in the frame of the machine. The upper part of the outer sleeve 10' is supported in the cylinder 1' and is further supported in an annular sleeve 54 by means of an axial ball bearing 55 one ring 56 of which is carried by the fixed part 53 in the frame of the machine, its other ring 57 being carried in the annular sleeve 54 whose inner cylindrical surface limits the lower part of the slits 36 and guides the lower outward projecting edge of the lifting members 35. By means of the threaded sleeve 52 the axial clearance of the ball bearings 47 and 55 is adjusted. A fabric guiding funnel 58 is mounted concentrically within the inner sleeve 11' for guiding of the finished part of the fabric. The said funnel 58 rests its upper outward projecting edge 59 against a depression 60 provided in the conical surface 19' formed in the end surface of the cylinder, and is provided with a recess 61 for the transfer needles 16' in their advanced position as indicated in FIGURE 11. The funnel or trumpet 58 is rotatably guided in the sleeve 51, resting by means of a stop collar 62 on the upper edge surface of the said sleeve. At its lower end the funnel 58 is provided with another stop collar 63 which has an outwardly projecting arm 64 to which is attached a coil spring 65 with its one end arranged, substantially tangentially to the collar 63, its other end being attached to a pin 66 provided on the fixed part 53. The coil spring 65 keeps the funnel 58 in a fixed position against a contact member (not shown) and the funnel is furthermore provided with an electric contact 67 adapted to give an alarm signal and to stop the machine when the funnel 58 is turned from its fixed position. One end wall 68 of the recess 61 is formed tangentially to the depression 61 so that the funnel 58 will be turned from its fixed position if one of the transfer needles 16', owing to a fault, is not withdrawn to its retracted position at the appropriate moment.

The transfer needle used in the embodiment of the machine shown in FIGURES 10-12 is of rectangular cross-section throughout its length, as indicated in FIGURE 14, and at its upper point 69 it is twisted 50 to 90° about its longitudinal axis and provided with a notch 70 for receiving the knitted loop 21', as indicated in FIGURE 18, whereas its lower end is provided with the notch 38 adapted to couple the needle 16' to the jack 35 by means of the tooth 37. The distance between the outer point 69 of the needle and the notch 38 is such that the jack 35 moves the needle point 69 to such an advanced position, indicated in FIGURE 11, that the point 69 enters a finished loop 21', which one course previously was released from the knitting needle 3' by which it has been knitted, and this is illustrated in FIGURE 18. The point 69 of the needle is displaced from the position indicated in FIGURE 18 by the relative angular movement between the cylinder 1' of the machine and the cylindrical body 10', 11', so that the loop 21' already knitted is advanced by one course in the direction of knitting and moved one wale to the side, thus reaching an adjacent needle 3a' as shown in FIGURE 19, after which knitting of the following course with loops 71 takes place in normal manner as indicated in FIGURE 20.

As will be seen from FIGURE 20, the knitted fabric now produced is run-resistant in the direction opposite that of knitting as far as the wales 72 and 73 are concerned, and it will be appreciated that corresponding run-resistance is obtainable for all the wales when the loops transferred by the transfer needles are staggered in consecutive courses by at least one wale and uniformly distributed over the part of the stocking which it is found desirable, so that each individual wale is made run-resistant by at least one transferred loop of the kind shown in FIGURE 20.

In order to hold the knitting needles 3' against tangential movement in their guiding slits 2', these may be supported in slits of wedge-shaped cross-section as indicated in FIGURE 12, the said wedge-shaped slits being formed radially in the upper outer edge of the machine cylinder.

It will be appreciated that the foregoing description of the circular knitting machine embodying the invention and the transfer needle embodying the invention should only be considered as practical examples of the said tools which are necessary for carrying the method into effect and that the scope of the invention is not limited to the embodiments disclosed. It will further be appreciated that by varying the number of knitting needles and the number of transfer needles and by varying the amount of the relative angular movement a very large number of different patterns for the distribution of the spread or transferred loops in the knitted fabric, for example a circularly knitted stocking, can be made. It will be unnecessary to disclose such variations since the foregoing disclosure will provide one skilled in the art with sufficient information to vary the said constructional details himself so as to produce a run-resistant net stocking by means of a circular knitting machine designed in accordance with the present invention.

What I claim and desire to secure by Patent Letters is:

1. A method of making a knit fabric employing a circular group of parallel needles and a group of transfer needles comprising, knitting a tubular fabric by forming loops upon the needles of the circular group in continuous succession, moving the needles of the transfer group upwardly and outwardly in succession into engagement with portions of predetermined knit needle loops and shifting the engaged portions of the predetermined needle loops laterally of the fabric to embrace needles of the circular group adjacent the needles of the circular group upon which the predetermined needle loops were formed.

2. A method of making a knit fabric as claimed in claim 1 wherein the engaged portions of the predetermined needle loops are shifted laterally while the said adjacent needles of the circular group are lowered, and raising the said adjacent needles of the circular group within the predetermined needle loops.

3. A method of making a knit fabric employing a circular group of parallel needles and a group of transfer needles comprising, knitting a tubular fabric by forming loops upon the needles of the circular group in continuous succession, moving the needles of the transfer group in succession from beneath the fabric upwardly and outwardly of the circular group of needles into engagement with preselected loops of the fabric previously cast off the needles of the circular group, and lifting by means of the needles of the transfer group the selected loops out of the plane of the fabric and onto needles of the circular group adjacent the needles on which the selected loops were formed.

4. A method of making a knit fabric as claimed in claim 3 wherein the selected loops are moved onto said adjacent needles of the circular group by shifting the transfer needles circumferentially relative to the circular group after lifting the selected loops from the fabric.

References Cited in the file of this patent

UNITED STATES PATENTS

| 596,301 | Leighton et al. | Dec. 28, 1897 |
| 981,318 | Scott | Jan. 10, 1911 |
| 1,817,566 | Jones | Aug. 4, 1931 |
| 1,883,297 | Jones | Oct. 18, 1932 |
| 1,982,800 | Friedmann | Dec. 4, 1934 |
| 2,022,418 | Heinitz | Nov. 26, 1935 |
| 2,012,095 | Cole et al. | Aug. 20, 1935 |
| 2,040,319 | Lombardi | May 12, 1936 |
| 2,051,724 | Larkin | Aug. 18, 1936 |
| 2,220,781 | Clauss | Nov. 5, 1940 |
| 2,720,767 | Stevenson | Oct. 18, 1955 |

FOREIGN PATENTS

| 908,976 | France | Nov. 12, 1945 |